United States Patent
Malamud et al.

(10) Patent No.: US 10,535,196 B2
(45) Date of Patent: *Jan. 14, 2020

(54) INDICATING THE GEOGRAPHIC ORIGIN OF A DIGITALLY-MEDIATED COMMUNICATION

(71) Applicant: Empire Technology Development LLC, Wilmington, DE (US)

(72) Inventors: Mark Malamud, Seattle, WA (US); Royce Levien, Lexington, MA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,904

(22) Filed: Jul. 17, 2017

(65) Prior Publication Data

US 2017/0316616 A1    Nov. 2, 2017

Related U.S. Application Data

(63) Continuation of application No. 13/878,180, filed as application No. PCT/US2012/052521 on Aug. 27, 2012, now Pat. No. 9,710,969.

(51) Int. Cl.
*G06T 19/00* (2011.01)
*G06T 17/05* (2011.01)
(Continued)

(52) U.S. Cl.
CPC .......... *G06T 19/006* (2013.01); *G01C 21/362* (2013.01); *G01C 21/3629* (2013.01);
(Continued)

(58) Field of Classification Search
None
See application file for complete search history.

(56) References Cited

U.S. PATENT DOCUMENTS 8,000,721 B2   8/2011   Hanner
8,036,356 B1   10/2011  Ghosh et al.
(Continued)

FOREIGN PATENT DOCUMENTS

JP   04-132483       5/1992
JP   2002277277 A    9/2002
(Continued)

OTHER PUBLICATIONS

"GeoChat: GeoChat is a collaboration tool that allows anyone to chat, report, and get alerts on their phone," InSTEDD Innovative Support to Emergencies Diseases and Disasters, accessed at https://web.archive.org/web/20120815100133/http://instedd.org/technologies/geochat/, archived on Aug. 15, 2011, accessed on Apr. 28, 2017, pp. 4.

(Continued)

*Primary Examiner* — Edward Martello

(57) ABSTRACT

Technologies are described for indicating a geographic origin of a digitally-mediated communication relative to a location of a recipient by presenting the indication in an augmented reality scene. For example, an augmented reality scene can be presented to the recipient. The geographic origin of an incoming digital communication may be determined and a relative location of the origin with respect to the recipient's location may be computed. A format for presenting the relative location may be derived from the digital communication and the geographic origin. The augmented reality scene may be updated with the relative location based on the derived format. Techniques for integrating digital communications, location-based services, and augmented reality applications can enhance the recipient's experience by providing a perceptual solution to the loss of certain fundamental aspects of natural communication, such as the (Continued)

ability to instantly determine the geographic origin or relative location of an incoming digital communication.

21 Claims, 8 Drawing Sheets

(51) Int. Cl.
    *G01C 21/36* (2006.01)
    *H04W 4/20* (2018.01)
    *H04W 4/21* (2018.01)

(52) U.S. Cl.
    CPC ..... *G01C 21/3632* (2013.01); *G01C 21/3647* (2013.01); *G01C 21/3652* (2013.01); *G01C 21/3697* (2013.01); *G06T 17/05* (2013.01); *H04W 4/21* (2018.02)

(56) References Cited

U.S. PATENT DOCUMENTS

| | | | |
|---|---|---|---|
| 8,089,513 B2 | 1/2012 | Miyashita et al. | |
| 2007/0024527 A1 | 2/2007 | Heikkinen et al. | |
| 2007/0242131 A1 | 10/2007 | Sanz-Pastor et al. | |
| 2009/0019366 A1* | 1/2009 | Abhyanker | G06F 3/0481 715/706 |
| 2010/0279776 A1 | 11/2010 | Hall | |
| 2011/0102459 A1 | 5/2011 | Hall | |
| 2011/0137561 A1 | 6/2011 | Kankainen | |
| 2011/0161856 A1 | 6/2011 | Nurmi et al. | |
| 2011/0190004 A1 | 8/2011 | Tenny et al. | |
| 2012/0293547 A1 | 11/2012 | Bai et al. | |

FOREIGN PATENT DOCUMENTS

| | | |
|---|---|---|
| JP | 2002-300548 | 10/2002 |
| JP | 2005241385 A | 9/2005 |
| JP | 2006101013 | 4/2006 |
| JP | 2006285833 A | 10/2006 |
| JP | 2010004381 A | 1/2010 |
| JP | 2011107893 A | 6/2011 |
| JP | 2011518452 A | 6/2011 |
| WO | 2014035368 A1 | 3/2014 |

OTHER PUBLICATIONS

"Global 360, release 2011.3: The comprehensive world gazetteer," Europa Technologies, accessed at https://web.archive.org/web/20120608225001/http://www.europa-tech.com/g360.php, archived on Jun. 8, 2012, accessed on Apr. 28, 2017, pp. 3.

"ICaller Location new version 2.0 coming soon: Free Software for Blackberry to pinpoint caller's locations on the Blackberry Maps," Software Labs, accessed at https://web.archive.org/web/20120629235014/http://www.i-softwarelabs.com/products/icallerlocation.jsp, release on Jul. 9, 2010, pp. 4.

"Send My Location," Google Play, accessed at https://play.google.com/store/apps/details?id=bg.angelov.send.my.location&hl=en, accessed on May 24, 2017, pp. 3.

"Find My Friends," iTunes Preview, accessed at https://itunes.apple.com/us/app/find-my-frtends/id466122094?mt=8, accessed on Apr. 28, 2017, pp. 2.

"Geotags and Location-Based Social Networking: Applications, OPSEC and protecting unit safety," U.S. Army Social Media Roundup, accessed at https://web.archive.org/web/20111120194736/http://dmna.state.ny.us/members/geotagging.pdf, archived on Nov. 20, 2011, accessed on Apr. 28, 2017, pp. 20.

"Viber adds Picture and Location Messaging to its Communications App," accessed at http://helpme.viber.com/,posted on Oct. 10, 2011, pp. 5.

Campbell, S., "Finding Your Friends via GPS with These 9 Free Mobile Apps," accessed at https://web.archive.org/web/20120805233814/http://www.makeuseof.com/tag/finding-your-friends-via-gps-9-free-mobile-apps/, May 10, 2010, pp. 2.

Extended European Search Report for counterpart Patent Application No. 12883785.3 dated Mar. 7, 2016, pp. 7.

Henry, A., "GeoRing Lets You See Your Calls on a Map and Customize iPhone Ringtones," Appscout, accessed at: https://web.archive.org/web/20120228015850/http://appscout.pcmag.com:80/apple-ios-iphone-ipad-ipod/268962-georing-lets-you-see-your-calls-on-a-map-and-customize-iphone-ringtones, Jan. 3, 2011, pp. 2.

International Search Report and Written Opinion for International Application No. PCT/US2012/052521 dated Nov. 6, 2012, pp. 16.

Rogstadius, J. and Bohra, A., "Automatic geo-tagging of social media status updates," https://web.archive.org/web/20110817232924/http://www.rhok.org/problems/automatic-geo-tagging-social-media-status-updates-0, archived on Aug. 17, 2011, accessed on Apr. 28, 2017, pp. 3.

* cited by examiner

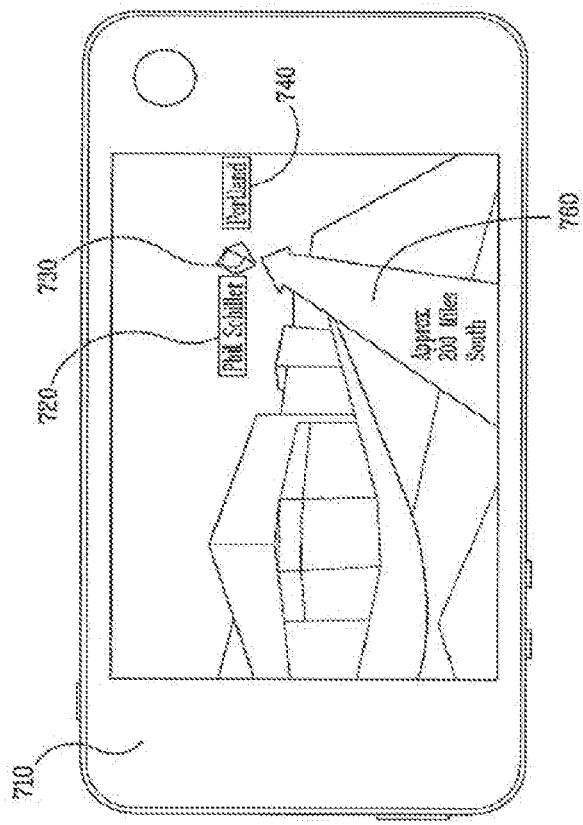
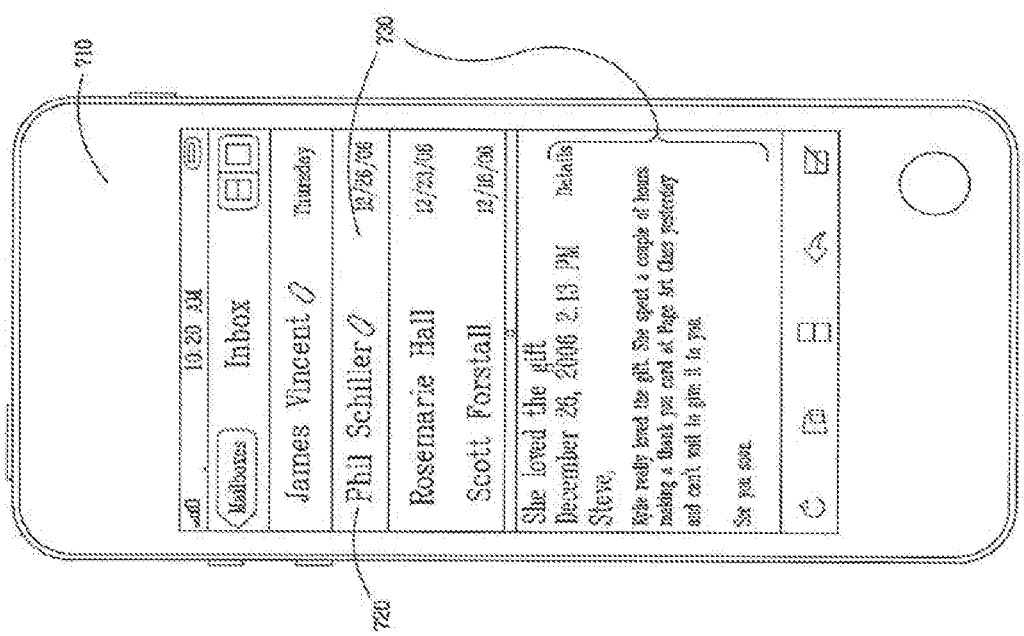
FIG. 7B
FIG. 7A

INDICATING THE GEOGRAPHIC ORIGIN OF A DIGITALLY-MEDIATED COMMUNICATION

CROSS-REFERENCE TO RELATED APPLICATIONS

The present application is a continuation under 35 U.S.C. § 120 of U.S. application Ser. No. 13/878,180, filed on Apr. 5, 2013, now U.S. Pat. No. 9,710,969, which is a U.S. National Stage filing under 35 U.S.C. § 371 of International Application No. PCT/US2012/052521, filed on Aug. 27, 2012. U.S. application Ser. No. 13/878,180 and International Application No. PCT/US2012/052521 are incorporated herein by reference in their entirety.

BACKGROUND

The spread of personal electronic devices such as smartphones, and accessibility to data networks and services via the Internet and other networks have enabled access and use of an increasing number of digitally-mediated communications, location-based services, and augmented reality applications. Digitally-mediated communications, such as e-mails, phone calls, text messages, and chat allow users to instantly exchange information. Similarly, location-based services enable the users, for example, to geographically tag their locations in social network applications. Furthermore, augmented reality focuses on combining real-world and computer-generated data including computer graphics objects blended into video and images in real-time for display to the users.

However, in today's digital world, certain fundamental aspects of natural communication are lost. These aspects include the ability of a person to instantly determine the geographic origin or the relative location of an incoming digital communication. For example, in the real-world, when someone calls a person's name, the person has an immediate sense of the direction from where the sound originated. In comparison, digitally-mediated communications provide little or no information about their geographic origins. For example, when the person receives a text message on his or her phone, the person may have no indication of the geographic origin of the message.

SUMMARY

In various embodiments, systems, methods, and computer-readable media are disclosed for indicating a geographic origin of a digitally-mediated communication relative to a location of a recipient of the communication by presenting the indication to the recipient in an augmented reality application.

In an embodiment, first and second users can be engaged in digital communication using first and second computing devices, respectively. For example, the first user may receive an e-mail from the second user and may desire to understand the geographic origin of the digital communication.

In an embodiment, an augmented reality scene may be rendered on the first computing device. The augmented reality scene may be indicative of a physical and virtual environment associated with the first user.

Furthermore, a geographic origin of a digital communication may be determined. For example, the digital communication may correspond to the email sent from the second user and received by the first user. The geographic origin may indicate a location of the second computing device initiating the digital communication relative to the location of the first computing device receiving the same digital communication. In an embodiment, the geographic origin may be computed based on global positioning system coordinates associated with the first and second computing devices, or may be retrieved from digital prints, such as geographical tags of the first and second users in a social networking application. Additionally, the geographic origin may be derived from the content of the communication.

In an embodiment, an augmented reality format may be determined the geographic origin may be presented in the augmented reality scene. The format may comprise a perceptual and modal presentation of the relative location of the second user in the augmented reality scene. For example, the format may comprise visual, auditory, and haptic three dimensional cues to position the received digital communication relative to the current geographic location of the first user. The cues can be presented to the first user in an augmented reality format.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 7A-B depict another example presentation of an augmented reality geographic origin derived from a digital communication.

DETAILED DESCRIPTION

Figure 1:
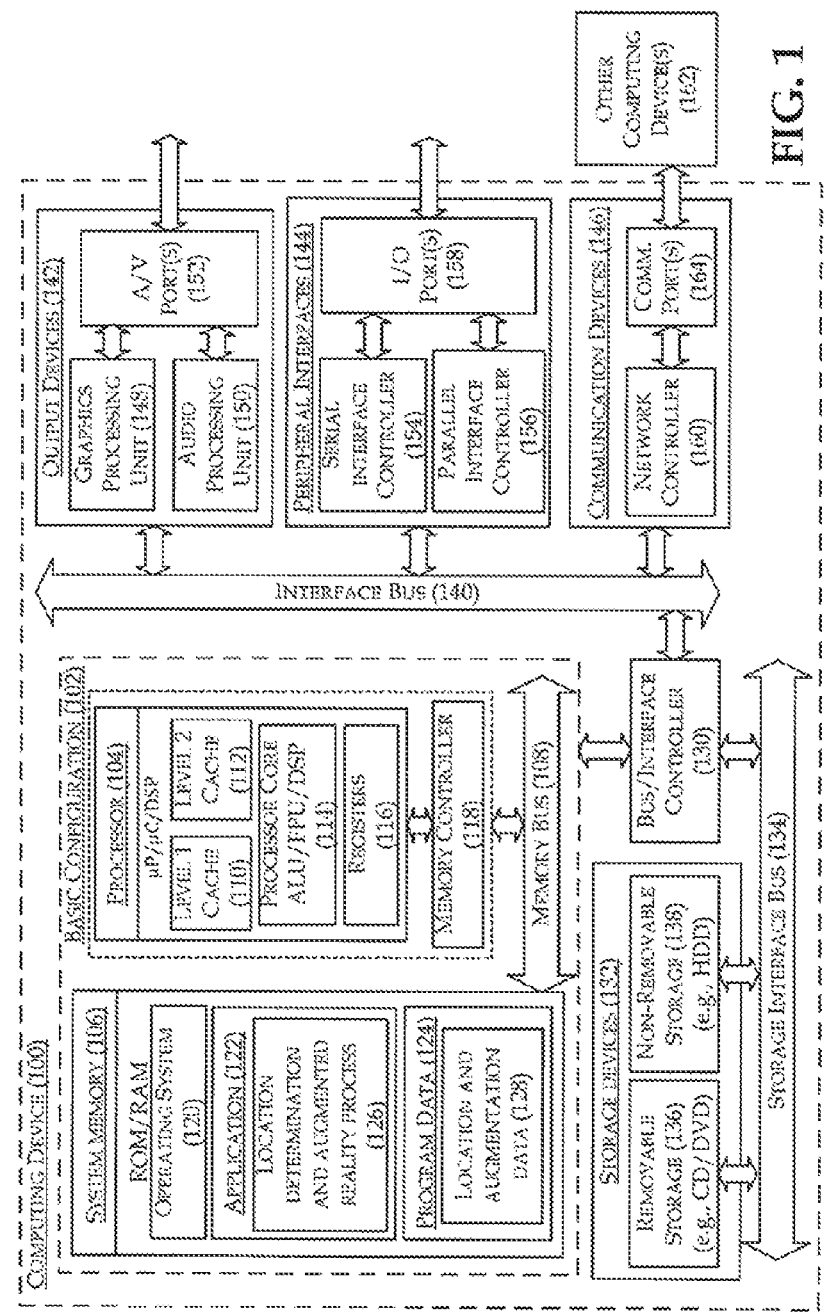
FIG. 1 depicts a block diagram illustrating an example computing device with which various embodiments of the present disclosure may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to augmented reality. Briefly stated, technologies are generally described for a system for processing augmented reality data, including automatically grouping a number of augmentations into clusters referred to as exemplars and rendering the exemplars in descriptive formats.

FIG. 1 depicts a block diagram illustrating an example computing device 100 with which various embodiments of the present disclosure may be implemented. In a very basic configuration 102, computing device 100 typically includes one or more processors 104 and a system memory 106. A memory bus 108 may be used for communicating between processor 104 and system memory 106.

Depending on the desired configuration, processor 104 may be of any type including but not limited to a microprocessor (μP), a microcontroller (μC), a digital signal processor (DSP), or any combination thereof. Processor 104 may include one or more levels of caching, such as a level one cache 110 and a level two cache 112, a processor core 114, and registers 116. An example processor core 114 may include an arithmetic logic unit (ALU), a floating point unit (FPU), a digital signal processing core (DSP Core), or any combination thereof. An example memory controller 118 may also be used with processor 104, or in some implementations memory controller 118 may be an internal part of processor 104.

Depending on the desired configuration, system memory 106 may be of any type including but not limited to volatile memory (such as RAM), non-volatile memory (such as ROM, flash memory, etc.) or any combination thereof. System memory 106 may include an operating system 120, one or more applications 122, and program data 124. Application 122 may include a location determination and augmented reality process 126 that is arranged to perform functions as described herein including those described with respect to operations described in FIGS. 3-8. Program data 124 may include location and augmentation data 128 that may be useful for operation with techniques for presenting a geographic origin of a digital communication in an augmented reality format as is described herein. In some embodiments, application 122 may be arranged to operate with program data 124 on operating system 120 such that a geographic origin or a relative location of a digital communication can be determined and rendered as an augmented reality based on a perceptual format. This described basic configuration 102 is illustrated in FIG. 1 by those components within the inner dashed line.

Computing device 100 may have additional features or functionality, and additional interfaces to facilitate communications between basic configuration 102 and any required devices and interfaces. For example, a bus/interface controller 130 may be used to facilitate communications between basic configuration 102 and one or more data storage devices 132 via a storage interface bus 134. Data storage devices 132 may be removable storage devices 136, non-removable storage devices 138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 106, removable storage devices 136 and non-removable storage devices 138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 100. Any such computer storage media may be part of computing device 100.

Computing device 100 may also include an interface bus 140 for facilitating communication from various interface devices (e.g., output devices 142, peripheral interfaces 144, and communication devices 146) to basic configuration 102 via bus/interface controller 130. Example output devices 142 include a graphics processing unit 148 and an audio processing unit 150, which may be configured to communicate to various external devices such as a display or speakers via one or more A/V ports 152. Example peripheral interfaces 144 include a serial interface controller 154 or a parallel interface controller 156, which may be configured to communicate with external devices such as input devices (e.g., keyboard, mouse, pen, voice input device, touch input device, etc.) or other peripheral devices (e.g., printer, scanner, etc.) via one or more I/O ports 158. An example communication device 146 includes a network controller 160, which may be arranged to facilitate communications with one or more other computing devices 162 over a network communication link via one or more communication ports 164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 may also be implemented as a personal computer including both laptop computer and non-laptop computer configurations.

Figure 2:
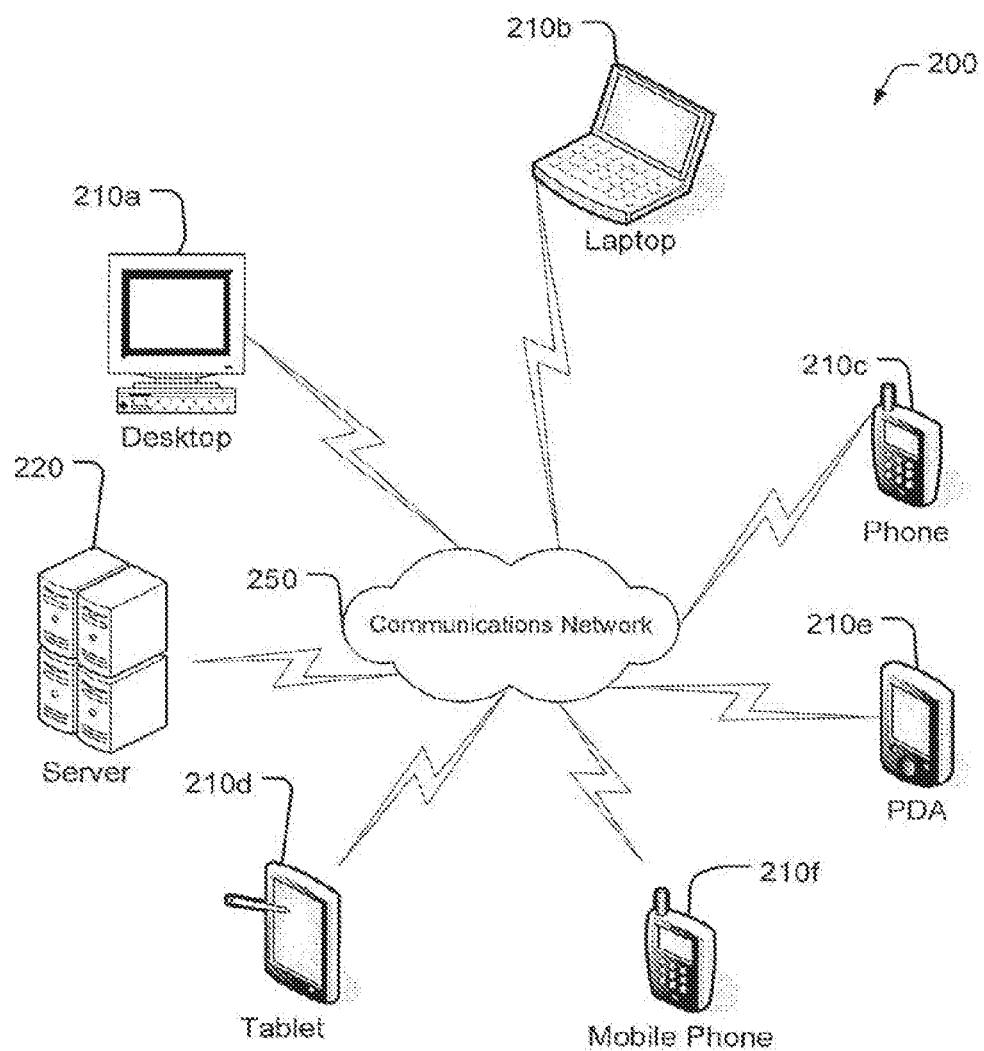
FIG. 2 depicts an example network environment in which various embodiments of the present disclosure may be implemented.

FIG. 2 depicts an example network environment in which various embodiments of the present disclosure may be implemented. In particular. FIG. 2 illustrates an example computing arrangement 200 comprised of computing devices 210 each of which may be adapted to provide location determination and augmented reality applications as described herein. The computing devices 210 may comprise, for example, any of a desktop computer 210a, a laptop computer 210b, a phone 210c, a tablet computing device 210d, a personal digital assistant (PDA) 210e, and a mobile phone 210f, each of which may be adapted to process and display location and augmented reality data to a user.

Each of the devices 210 may be adapted to communicate using a communications network 250. The communications network 250 may be any type of network that is suitable for providing communications between the computing devices 210 and any servers 220 accessed by the computing devices 210. The communications network 250 may comprise a combination of discrete networks which may use different technologies. For example, the communications network 250 may comprise local area networks (LANs), wide area networks (WAN's), cellular networks, WiFi networks, fiber-optic networks, or combinations thereof. The communications network 250 may comprise a combination of wireless and wireline networks. In an example embodiment, the communications network 250 may comprise the Internet and may additionally comprise any networks adapted to communicate with the Internet. The communications network 250 may comprise a wireless telephony network that is adapted to communicate video, audio, and other data between the computing devices 210 and the servers 220.

In an embodiment, location and augmentation data can be processed by an augmented reality device, such as any of the computing devices 210. The augmented reality device can be coupled to an analysis engine hosted on a computing device, such as the server 220.

In an example scenario, the augmented reality device 210 may be directed, for example, by a user to activate an augmented reality application. The augmented reality application may process location and augmented reality data to present augmentations to the user on the augmented reality device 210. The location data may include a location of the user and relative locations of objects, places, and persons within a certain range of the user. The location of the user may be derived from a location of the augmented reality device 210. The augmentation reality data may include information associated with physical and virtual environments of the user that may comprise location and descriptive information about the user and the objects, places, and persons within the certain range.

The augmented reality device 210 can communicate with the server 220 over the communications network 250. The server 220 can comprise a repository of augmentation data and can be adapted to provide augmentation services. For example, the server 220 can include a library of rendering models and algorithms adapted to perform real-time rendering of augmentations. The augmented reality device 210 can query the server 220 to determine and receive augmentations based on at least the augmented reality device's location. In one scenario, the server 220 can transmit augmentations and corresponding rendering formats to the augmented reality device 210 which can render the received augmentations to the user. In an alternative scenario, the server 220 can render the augmentations and transmit the rendered augmentations to the augmented reality device 210.

In yet another scenario, augmentation data can be stored on the augmented reality device 210. As such, rendering of the augmentation data can be processed locally on the augmented reality device 210, eliminating the need for the augmented reality device to query the server 220. In a further scenario, the augmented reality device 210 can be in communication with another computing device 210 to exchange location and augmentation data and services. For example, the tablet 210d can be adapted to provide an interface to the user and the server to provide the user's location to the desktop 210a. In turn, the desktop 210a can be adapted to provide augmentation services to the user via the interface tablet 210d.

Figure 3:
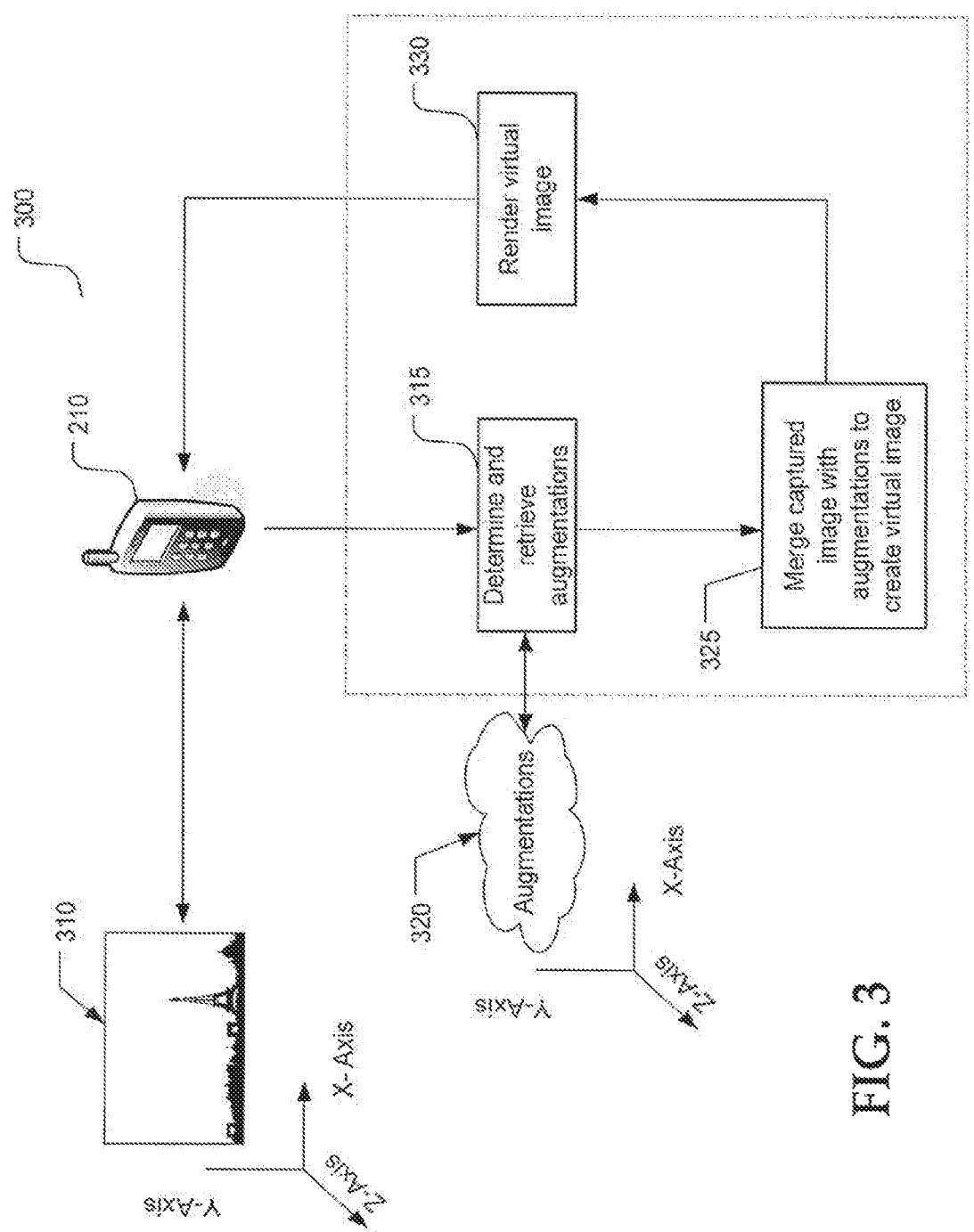
FIG. 3 depicts an illustrative embodiment of an augmented reality system.

FIG. 3 depicts an illustrative embodiment of an augmented reality system 300. A scene 310 may be viewed and captured by the augmented reality device 210. For example, the augmented reality device 210 can integrate an image or a video capture device. Alternatively or additionally, the augmented reality device 210 can be adapted to retrieve an image of the scene 310 based on a geographic location of the augmented reality device 210. The image can be retrieved from data stored locally on the augmented reality device 210 or externally on another device 210 or the server 220 in communication with the augmented reality device 210 as shown in FIG. 2. The scene 310 may be associated with a set of scene coordinates (X, Y, Z). Based on the image of the scene 310 and/or the user's context, the augmented reality device 210 may determine and retrieve augmentations 320 (indicated by drawing reference number 315). The augmentations 320 can comprise virtual representations of the scene 310 and of objects, places, or persons associated with the scene 310. For example, the augmentations 320 may comprise other images, metadata, information, or descriptions related to the scene 310. The augmentations 320 may also be associated with a set of coordinates (X, Y, Z). Furthermore, the augmented reality device 210 may merge the image of the scene 310 with the augmentations 320 to generate a virtual image of the scene 310 (indicated by drawing reference number 325). As such, the augmented reality device 210 may render and display the virtual image (indicated by drawing reference number 330). The generation of the virtual image may be performed with a standard computer graphics system internal or external to the augmented reality device 210. The graphics system may align the image of the scene 310 and the augmentations 320 based on the associated coordinates (X, Y, Z). Further, the graphics system may use real world information associated with objects within the scene 310 so that the virtual image can be correctly rendered. The determination of the augmentations 320, the merging and aligning of the image and the augmentations 320 to create the virtual image, and the rendering of the virtual image can be accomplished locally by the augmented reality device 210, externally by another device 210 or the server 220 in communication with the augmented reality device 210, or can be distributed between the augmented reality device 210, the other devices 210, and/or the server 220.

Figure 4:
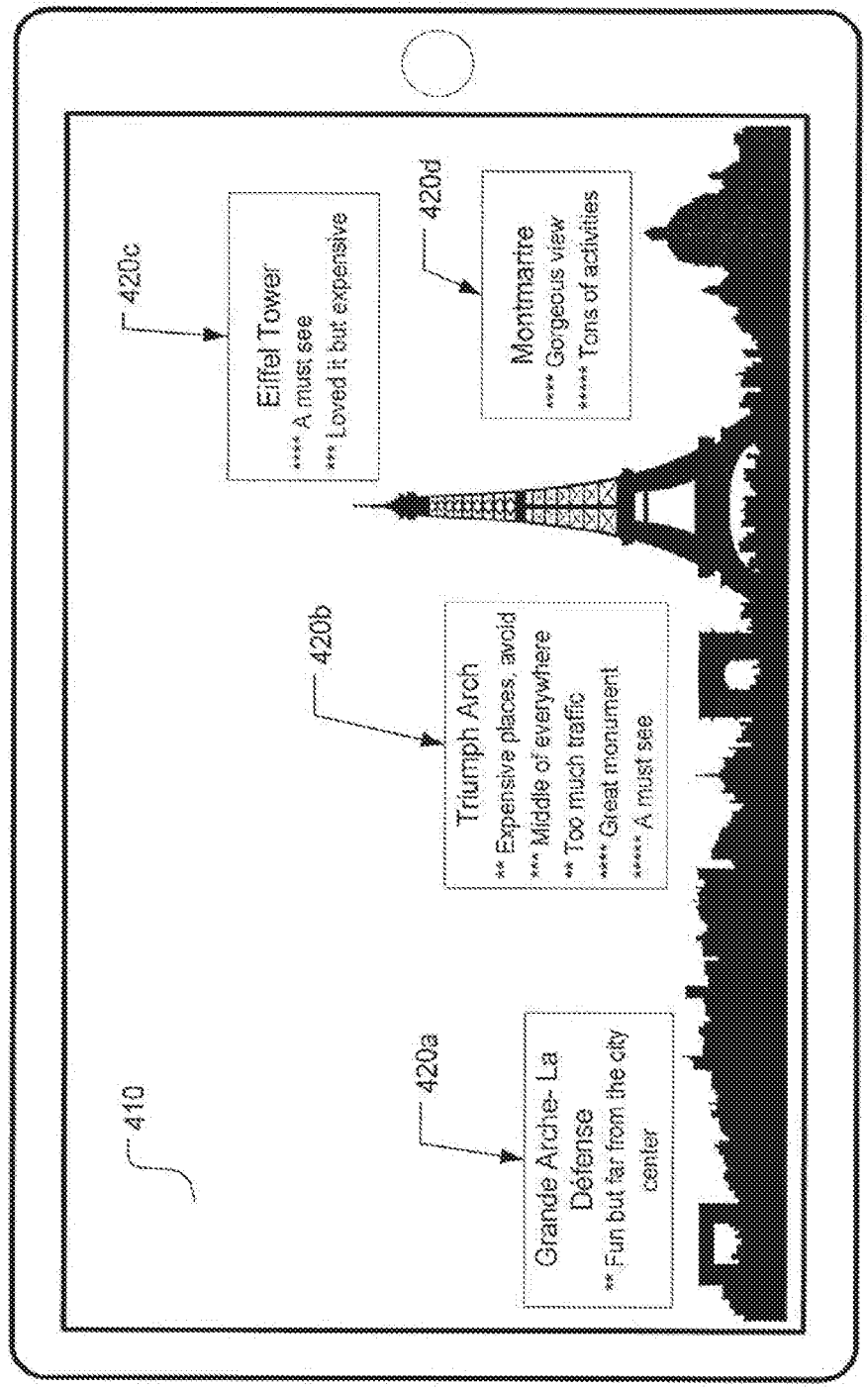
FIG. 4 depicts an example of an augmented reality application displaying augmented reality data on a computing device.

FIG. 4 depicts an example of an augmented reality application displaying augmented reality data on a computing device. In particular, FIG. 4 illustrates a virtual image 410 displayed on the augmented reality device 210 of FIG. 2. As depicted, the virtual image 410 can comprise an image of a scene, such as a panoramic view of Paris or a portion thereof, merged with augmentations 420a-d describing monuments in the scene. The augmentations 420a-d can comprise descriptive titles and comments created by a user 430 of the augmented reality device 210. A comment can comprise a rating in the form of a one-to-five star scale and a feedback text field. The user 430 can select and expand any number of the augmentations 420a-d. For example, the user 430 can shake the augmented reality device 210, mouse over, single-click, double-tap, or motion over the augmentations 420*a*-420*d* to retrieve and display additional information about the monuments contained in the augmentations 420*a-d*. Additional information can be retrieved from data stored locally or externally to the augmented reality device 210. For example, the additional information may comprise images taken by tourists (e.g., other users), a list of attractions nearby, and a list of restaurants with menus, prices, advertisement, etc.

In a world where digital communications, augmented reality, and location-based services are becoming commonplace, it may be useful to have a way to integrate these different digital tools. FIGS. 5-8 present embodiments for integrating these tools in order to provide a perceptual solution to the loss of certain fundamental aspects of natural communication, such as the ability of a user to determine a geographic origin or a relative location of an incoming digital communication. The perceptual solution can enhance the digital communication by presenting to the user a rich augmented reality environment enhanced with a two and/or three dimensional indication of a geographic origin of the digital communication. The indication can comprise a combination of visual, auditory, or haptic cues while the information can describe, for example, the origin of the digital communication in addition to objects, places, and persons in the vicinity thereof.

Figure 5:
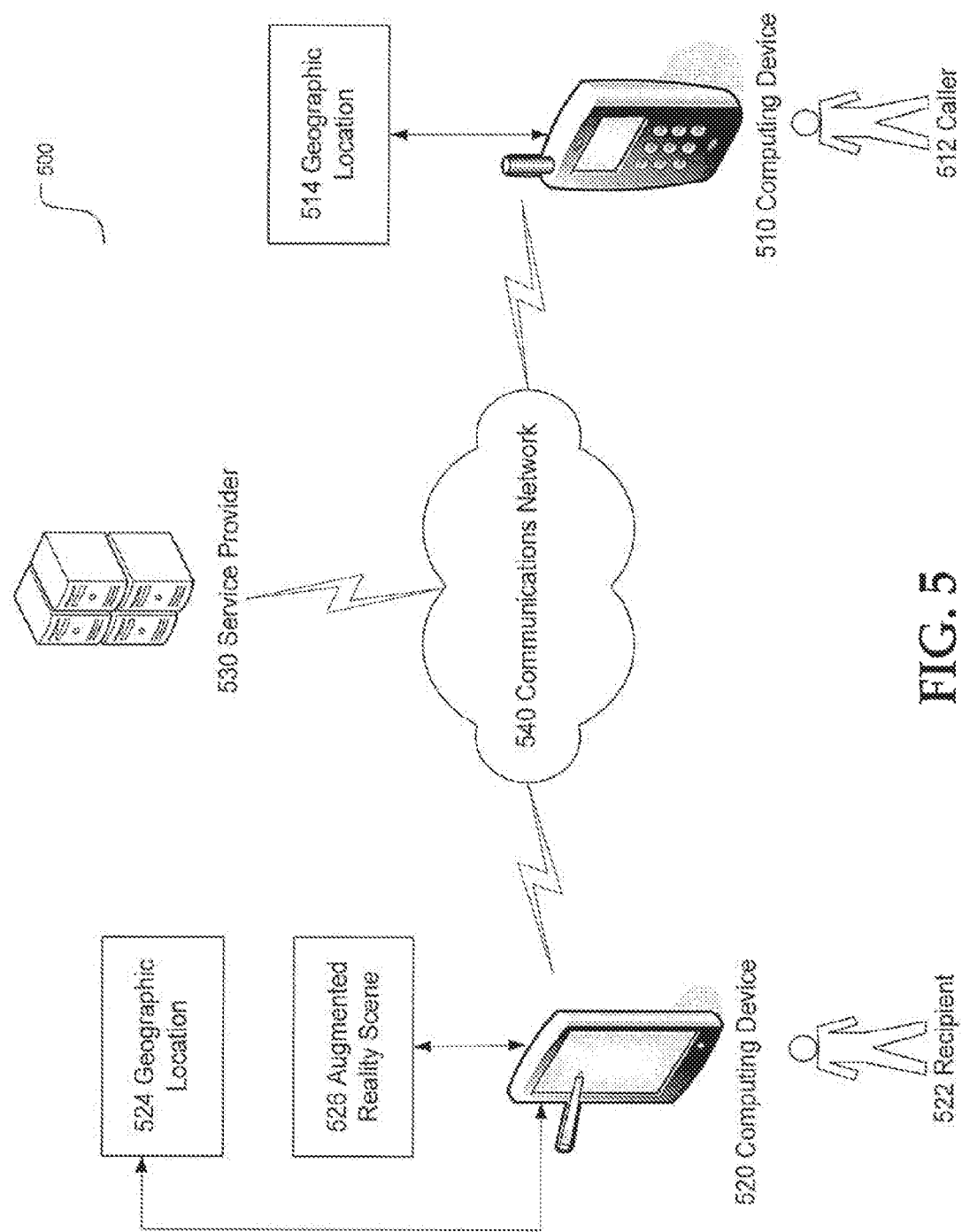
FIG. 5 depicts an illustrative architecture for presenting an indication in an augmented reality format of a digital communication geographic origin.

FIG. 5 depicts an illustrative architecture 500 for presenting an indication in an augmented reality format of a digital communication and its geographic origin. Multiple users can be engaged in digital communications over a network. The digital communications may comprise at least a combination of real-time (e.g., phone calls, instant messages, chat), store-and-forward (e.g., e-mails, data exchanges), and social media communications. As depicted in FIG. 5, a first user, such as a recipient 522, can be associated with a first computing device 520. The first computing device 520 can be any of the devices 210 of FIG. 2, such as the tablet 210*d*. Similarly, a second user, such as a caller 512, can be associated with a second computing device 510. The second computing device 510 can be any of the devices 210 of FIG. 2, such as the mobile phone 210*f*. The first and second users can digitally communicate through the computing devices 520 and 510 over a communications network 540. The communications network 540 can embody some or all elements of the communications network 250 of FIG. 2. For example, the communications network 540 may comprise cellular and WiFi networks. Additionally, a service provider 530 can manage the communications network 540 and certain services provided to the computing devices 510 and 520. The service provider 530 may comprise the server 220 of FIG. 2 and may be associated with an internet service provider, a cable operator, a mobile network operator, social network operator, and the like.

In an embodiment, the first and second users may be associated with geographic locations. The geographic locations can be derived from locations of the computing devices 510 and 520. For example, the computing devices 510 and 520 may be equipped with components and applications for receiving and processing location information from a satellite based system, such as a global positioning system (GPS). The received information may comprise GPS coordinates. In another example, the service provider 530 can compute the geographic locations using cellular triangulation or wireless access point interpolation techniques. The service provider 530 can automatically or upon request transmit the computed locations to the computing devices 510 and 520. In a further embodiment, the geographic locations can be computed using geographical tagging (also referred to as "geotagging") techniques. The geotagging techniques allow the users to add geographical identification metadata to various captured media such as photographs, videos, websites, text messages, really simple syndication (RSS) feeds, and the like. For example, geotagging hardware and software may be embedded in the computing devices 510 and 520. As such, the caller 512 and the recipient 522 may geotag pictures of their respective locations taken with the computing devices 510 and 520. The geotagged pictures may be uploaded to a server that can be hosted by the service provider 530. Additionally or alternatively, the server can be hosted on a social media network in communications with the computing devices 510 and 520 over the communications network 540. Examples of social media network offering geotag services include FACEBOOK, GOOGLE+, and FOUR SQUARE.

In an embodiment, the geographic locations may be stored locally on the computing devices. For example, a location 514 associated with the caller 512 can be stored on the second computing device 510. Additionally, the geographic locations may be stored remotely on a server in communication with the computing devices 510 and 520. For example, the location 514 may be stored on the service provider 530. Similarly, a geotagged picture captured by the first computing device 520 and comprising a geographic location 524 associated with the recipient 522 may be stored on a social media server, such as a FACEBOOK server. In a further embodiment, the geographic locations can be automatically or upon request exchanged between the computing devices 510 and 520 and the server. For example, the location 514 can be computed locally on the second computing device 510 and automatically transmitted to the server and the first computing device 520. Similarly, upon request from the first computing device 520, the server can transmit the locations 514 and 524 to the first computing device 520.

In an embodiment, the first and/or second user may control the geographic location associated with the digital communication. The control can comprise a sharing degree, a resolution level, and a presentation preview. The sharing degree can include a privacy level for sharing the user's geographic location with other users and with the server. For example, the caller 512 may enable or disable the determination of his or her geographic location on the second computing device 510. Such control can be exercised by hard or soft buttons configured to turn on or off location based services. Similarly, the caller 512 may enable or disable the exchange of his or her geographic with the server or with the first computing device 520. The resolution level can comprise a control over a detail and accuracy range of the shared geographic location. For example, the caller 512 may desire to share his or her location within three feet, ten yards, a street level, a city level, and the like. Similarly, the caller may desire to share a textual description (e.g. "I am in Paris, at 16 rue de la fleur") or a graphical representation (e.g. a 3D Eiffel Tower graphic located over Paris on a 2D map of the world). Such control can be exercised by a hard or soft slider button on the second computing device 510. The presentation preview can comprise presenting the geographic location to the user via the user's computing device and allowing the user to edit the presented information prior to sharing the geographic location with other users or the server. For example, a geotagged photograph created by the caller 512 may be previewed and edited on the second computing device 510 prior to transmission to the first computing device 520. As an illustration of the control, when Mark composes a text message that he plans to send to his friend Roy, Mark may fully enable the location services on his smartphone to include with the text message his precise location, such as "on the table behind the bar at Jamieson Grille, 400 Courthouse Square, Alexandria, Va." However, when Mark chats with his boss Eve, Mark may modify his location services settings so that Eve may receive only a general sense of his location, such as "nearby the United States Patent and Trademark main campus."

In an embodiment, the first user may be interested in determining the geographic origin of an incoming digital communication initiated by the second user. The geographic origin can be derived using a location-based service application. The location-based service application can be embedded in the first computing device 520. Additionally, the location-based service application can be coupled to an analysis engine hosted on a remote server. As such, determining the geographic origin can be processed locally on the first computing device 520 or can be distributed between the first computing device 520 and the remote server. Furthermore, the location-based service application can directly and indirectly determine the geographic origin. A direct determination can be derived directly from the geographic location associated with the second computing device 510. For example, the computing devices 510 and 520 can be configured in a peer-to-peer network architecture where the geographic information can be exchanged directly between the computing devices 510 and 520. An indirect determination can require the assistance of a third party. For example, during a cell phone conversation between the caller 512 and the recipient 522, the service provider 530 may use cellular triangulation techniques to determine the location 514 of the second computing device 510. Upon request, the service provider 530 can deliver the determined location 514 to the first computing device 520 as a payload within the digital communication. Moreover, the location-based service application can explicitly or implicitly determine the geographic origin. An explicit determination can involve an analysis of a single digital transmission. For example, the recipient 522 may receive from the caller 512 a geotagged photograph which comprises geographical metadata. An implicit determination can involve an analysis of multiple digital transmissions. For example, the caller 512 may send two e-mail transmissions to the recipient 522 stating "I am in Seattle" in the first e-mail and "I am in Pioneer square" in the second e-mail. Each e-mail on itself may not be sufficient to determine the caller's 512 location at a desired resolution. The location-based service application may comprise text recognition software configured to analyze the received e-mails and derive a more accurate location such as "the caller is in Pioneer Square, Seattle."

In an embodiment, a relative location can be determined. The relative location can be the geographic location 514 of the second computing device 510 relative to the geographic location 524 of the first computing device 520. The first computing device 520 can run the location-based service application, which in turn, can compute the relative location by comparing the geographic locations 514 and 524. For example, the computing devices 520 and 510 can be located at the corner of First Ave and Union Street, Seattle, Wash. and Third Ave and Union Street, Seattle, Wash. respectively. As such, the location-based application can determine that the second computing device 510 is two blocks east of the first computing device 520. Similarly, the relative location can be processed on a server in communication with the first and second computing devices 520 and 510. As described herein above, the server can manage the communications between the computing devices 520 and 510 and can have access to the geographic locations 524 and 514. Upon request from the first computing device 520, the server may compute and transmit the relative location to the first computing device 520. For example, the service provider 530 may apply cellular triangulation techniques and determine that the computing devices 520 and 510 are respectively located at the corner of First Ave and Union Street, Seattle, Wash. and the corner of SW Broadway and SW Oak Street, Portland, Oreg. Upon request from the first computing device 520, the service provider 530 may transmit to the first computing device 520 an indication that the second computing device 510 is approximately two hundred miles south of the first computing device 520.

In an embodiment, a format can be determined for presenting the geographic origin of the incoming digital communication on the first computing device 520. Additionally, the format can comprise a presentation of the relative location. The presentation can comprise rendering and displaying the geographic origin and the relative location as an augmented reality based on the determined format. The rendering and displaying can be processed locally on the first computing device 520 or can be distributed between the first computing device 520 and a server in communication with the first computing device 520. The format can comprise instructions for presenting the geographic origin and the relative location in an augmented reality application. The instructions may include information for integrating the geographic origin and the relative location within an augmented reality scene 526 associated with the first computing device 520. Further, the format can provide a perceptual indication of the geographic origin and the relative location within the augmented reality scene. The perceptual indication can comprise sensorial representations and can span different modalities configured to provide a three dimensional (3D) perception of the geographic origin and the relative location. For example, the format can provide a visual representation such as a 3D arrow to indicate direction, an auditory cue such as a ping to indicate distance, and a haptic prompt such as a vibration to indicate reaching a destination.

In an embodiment, the format can be determined based on at least the digital communication, the geographic origin, the relative location, and presentation requirements. For example, the type and content of the digital communication can be analyzed to derive the format. The geographic origin and relative location may comprise information such as distance, direction, orientation, coordinates, and the control level that can be analyzed to update the format. Additionally, the presentation requirements may include size, font, background, animation, and presentation persistence that can be used to further refine the format. As an illustration, the digital communication may comprise an e-mail stating that the second user is waiting at the Eiffel Tower in France. As such, the format of the geographic origin can comprise a glyph in the shape of a 3D envelope located next to a 3D object representing the Eiffel Tower. Additionally, based on the geographic origin, it may be determined that the first user is ten blocks south of the second user. The format may be updated to include an arrow with a length representative of the ten block distance and a north orientation representative of the direction. Further, the presentation requirements may comprise a blinking rate used to animate the glyph until an acknowledgment is received from the first user.

In an embodiment, the format can comprise a cross-modality presentation of the geographic origin and the relative location configured to provide perceptual geographic hints in a three dimensional environment. The cross-modality presentation can comprise, for example, a combination of visual, auditory, and haptic cues. The perceptual geographic hints can be configured to provide to the first user 522 via the first computing device 520 a three dimensional orientation of the location of the last digital communication associated with the second user 512 or the second computing device 510. For example, the (X, Y, Z) coordinates of the first and second computing devices 520 and 510 may be derived. The coordinates may indicate that the first user 522 is on the street level three block south from the Empire State Building in New York, while the second user 512 is on top of the building. As such, a 3D arrow may be presented within the augmented reality scene 526 orienting the first user 522 three block north and pointing upward at a slope of a hundred and two floors indicating the top of the Empire State Building. Similarly, the first user 522 may receive a long e-mail from the second user 512 while driving west on a highway. The first computing device 520 may determine that the second user 512 is two miles west of the first user 522. As such, the first computing device 520 may read the e-mail over the first user's 522 car audio system. The reading can be broadcasted over the appropriate car speakers, such as the front speakers in this example, to indicate that the second user 512 is straight ahead. Additionally, the reading volume may change over time. For example, the volume may increase to indicate that the distance between the first and second users 522 and 512 is changing or shrinking. As an additional illustration, the second user 512 may be on the same building floor but few desks north-east of the first user 522. A corner of the first computing device 520 may vibrate to orient the first user 522 to the location of the last received communication, such as the corner corresponding to the north-east orientation.

In an embodiment, the format can comprise visual, auditory, and haptic presentations or combinations thereof. The visual presentation can comprise a graphical object and textual information. The graphical object's size and animation can be used to indicate distance. For example, the smaller the size, the farther away the geographic origin may be. Similarly, the graphical object may blink at different rates or may be color-coded to indicate the distance. The textual information may comprise a description about the geographic origin. For example, the textual information may state "six miles west" or "Sam's restaurant at 412 Angell Street." The auditory representation can comprise sound and can correlate volume and quality levels with the geographic origin. For example, the auditory representation may include a sonar-like ping to indicate distance. Additionally, the haptic representation can comprise a vibration mode that can be activated on the first computing device 520. For example, the closer the geographic origin is, the higher the vibration rate may be.

In a further embodiment, additional information about objects, places, activities, persons, and the like within a certain range of the geographic origin may be also presented on the first computing device 520. The information can reside on a server provided by the service provider 530, and can be derived based on the geographic location 514 and a predefined range. Upon request from the first computing device 520, the server can retrieve and transmit the information to the first computing device 520. The first computing device 520 may present the information as a list with text descriptions, as hyperlinks, or as an augmented reality object within the augmented reality scene 526.

In an embodiment, the first computing device 520 may comprise a first application, such as an augmented reality application, that may present the augmented reality scene 526, and a second application, such as the location-based service, that may provide the geographic locations 514 and 524 of the computing devices 510 and 520. The two applications can be integrated to present an indication of the digital communication's geographic origin as an augmented reality object within the augmented reality scene 526. The integration can comprise the following elements:

(a) the first computing device 520 may be equipped with a camera, other hardware and software, or may have access to systems which can provide visual information derived from the surroundings of the first computing device 520;

(b) the first application can be configured to present the augmented reality scene 526 derived from the visual information either directly by the first application (e.g. through access to hardware or low level system services), or by a platform or other service (e.g. in the form of an image or a video feed);

(c) the second application can be configured to determine the geographic origin directly from the digital communication (e.g. a mobile phone or chat client that already has the geographic information), or by the platform or other service (e.g. an operating system (OS) level application programming interface (API) which can be called to determine the origins of various communications);

(d) an activation mechanism to engage the first and second applications. The mechanism can comprise, for example, a hard or soft button, a gesture, or a similar interaction that allows the first user to activate the functionality;

(e) a delivery mechanism for delivering the geographic origin from the second application to the first application. The delivery mechanism may comprise, for example, APIs to exchange the information between the two applications; and (f) a format mechanism for determining appropriate and/or optimal means and modality for presenting the geographic origin in the augmented reality scene.

In a further embodiment, the format mechanism may be configured to present the geographic origin in a combination of visual, auditory, and haptic three dimensional presentations. The format can be derived format least the digital communication, the geographic origin, and the presentation requirements as follows:

(a) a graphical object derived from the type of communication (e.g. an e-mail may be presented as an envelope, a chat as a user profile, a phone call as a handset, etc.);

(b) an animation of the graphical object (e.g. the graphical object may blink until acknowledged by the first user);

(c) a level of detail included with the graphical object (e.g. distance in miles, country, state, street information, etc.);

(d) a presentation persistence (e.g. the graphical object disappears after a predefined amount of time, after the original communication is deleted, etc.);

(e) a presentation of other graphical hints to help orient the first user with respect to the geographic origin (e.g., an arrow may appear in the augmented reality scene that points towards the origin of the digital communication);

(f) a sound associated with the type of communication (e.g., a ping for an e-mail, a chatter for an instant message, an audio ring for a phone call, etc.);

(g) a sound associated with the geographic origin (e.g. a particular theme associated with a geographic location such as the French national anthem for a communication that originates from France, etc.);

(h) a volume and quality of the sound correlated with the geographic origin (e.g. a lower volume for a greater distance); and (i) a vibration rate and amplitude correlated with the geographic origin (e.g. a stronger and more frequent vibration for a smaller distance).

Figure 6A:
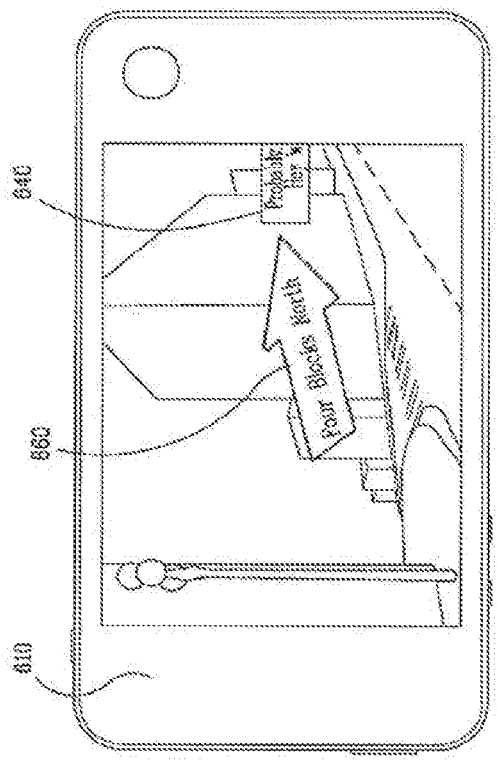
FIGS. 6A-C depict an example presentation of an augmented reality geographic origin derived from a digital communication.
Figure 6B:
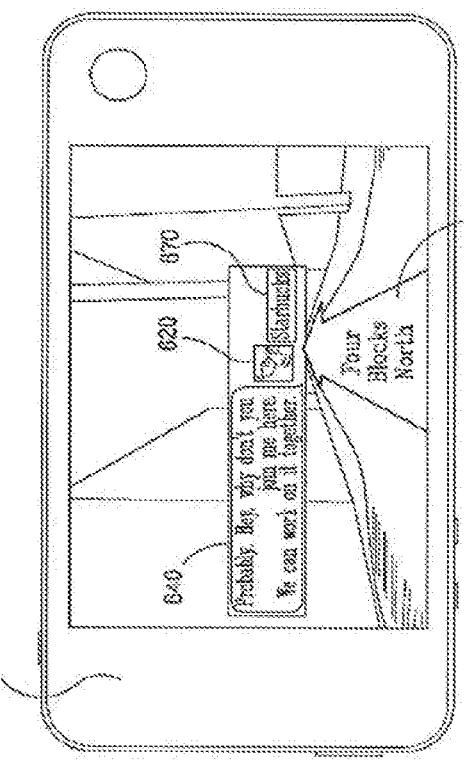
Figure 6C:
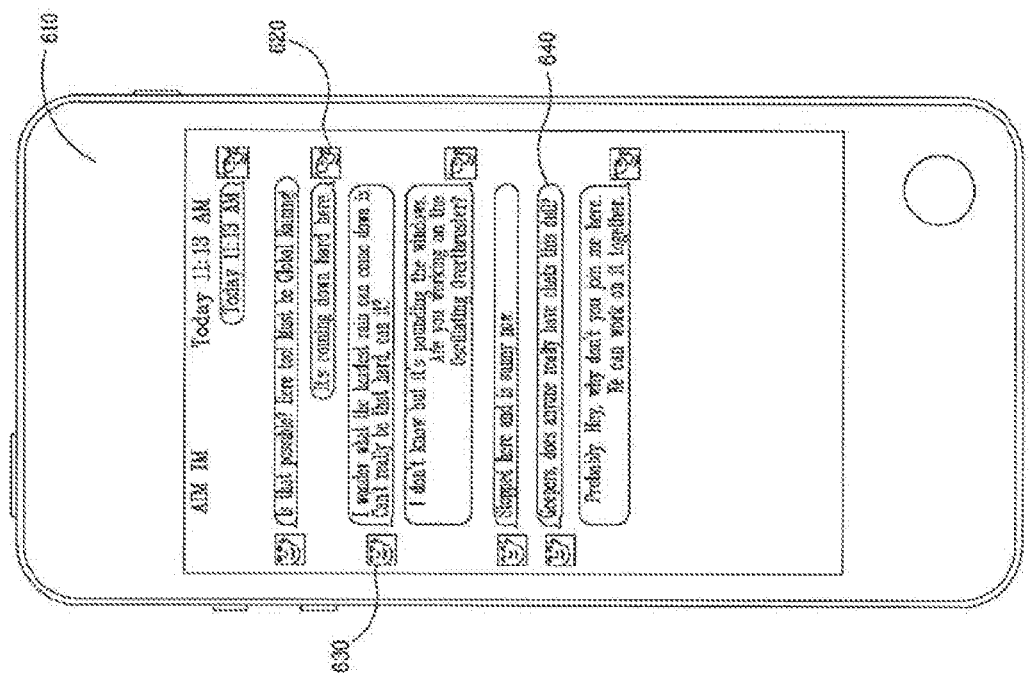

FIGS. 6A-C depict an example presentation of an augmented reality geographic origin derived from a digital communication. Referring to FIG. 6A, a computing device 610 can be associated with a first user 630. The computing device 610 can be any of the devices 210 of FIG. 2. For example, the computing device 610 can be smartphone, such as a GOOGLE ANDROID phone, a MICROSOFT WINDOWS phone, or an APPLE IPHONE, connected to the Internet. Further, the computing device 610 may comprise augmented reality and location-based applications. The first user 630 may use the computing device 610 to exchange digital communication, such as instant messaging 640, with a second user 620. The second user 620 may be associated with a second computing device (not shown). The first user 630 may receive a message from the second user 620 such as an invitation for a meeting (shown in FIG. 6A as a message stating "Hey, come join me!"). As such, the first user 630 may be interested in determining the location of the second user 620.

In an embodiment, the first user 630 may use the augmented reality and the location-based services to determine the geographic origin of the digital communication 640. Referring to FIG. 6B, the first user 630 may hold-up the augmented reality and location-based enabled computing device 610 and scan the surrounding area. The computing device 610 may present to the first user 630 an augmented reality scene based on the first user's 630 geographic location, surroundings, and other factors such as the available augmented reality service. Further, the first computing device 610 may determine the relative location of the second user 620 or the second computing device. The first computing device 610 may determine an augmented reality format to present the relative location within the augmented reality scene. For example, the presentation format may comprise a three dimensional arrow 660 within the augmented reality scene pointing in the direction of the geographic origin of the digital communication 640. The length of the arrow 660 may indicate the distance to the geographic origin. The arrow 660 may also comprise a text, such as "Four Blocks North," describing a direction to the geographic origin. A sound, such as a sonar-like ping, may also be activated to further orient the first user 630 to the geographic origin. For example, the first user 630 may orient the computing device 610 so that the sound disappears and the arrow 660 points straight ahead as shown in FIG. 6C. The computing device 610 may present within the augmented reality scene a glyph at the end of the arrow 660. The glyph may comprise the last digital communication 640, the second user's 620 avatar and geographic location 670. The geographic location 670 may comprise a text describing a venue where the second user 620 is located. Additionally, the geographic location 670 may comprise a hyperlink to a webpage about the venue. The computing device 610 may update the augmented reality scene, including the geographic origin indication (e.g. the arrow 660 and the glyph), as the geographic location of either the first or the second user 630 and 620 changes. For example, as the first user 630 walks toward the venue described in the geographic location 670, the computing device 610 may update the arrow 660 and the glyph. The arrow 660 may be presented as shorter and shorter whereas the glyph gets larger and larger. When the first user 630 arrives at the venue, the computing device 610 may vibrate to indicate the close proximity of the second user 620.

FIGS. 7A-B depict another example presentation of an augmented reality geographic origin derived from a digital communication. Referring to FIG. 7A, a computing device 710 can be associated with a user. The computing device 710 may comprise some or all elements of the computing device 610 of FIGS. 6A-B and may be enabled to provide augmented reality and location-based services. In an embodiment, the user might receive an e-mail 730 on the computing device 710 from a sender 720. The user may know that the sender 720 is traveling, but may not know the sender's 720 geographic location. Moreover, the sender 720 may control the level of detail about his or her location. For example, the sender 720 may allow the user to only determine the sender's geographic location with city-level accuracy. Referring to FIG. 7B, the user may hold the computing device 710 up to see an augmented reality scene that includes a three dimensional indication of the email's 730 geographic origin. The indication may comprise an arrow 760 describing that the sender 720 is in a city, such as Portland, at a certain distance and direction, such as two hundred miles south of the user's current location. The indication may also comprise a glyph, such an image of an envelope placed at the tip of the arrow 660, representing the e-mail 730. The indication may provide graphical, textual, and auditory information about the geographic location. For example, the size of the glyph may suggest the distance between the user and the sender. The textual information may further describe the distance by complementing the glyph's size to say "Approx. 200 Miles South." Further, the computing device 710 may aurally recite the geographic origin at a high volume to say that "the sender is in Portland, approximately 200 miles of your location."

Figure 8:
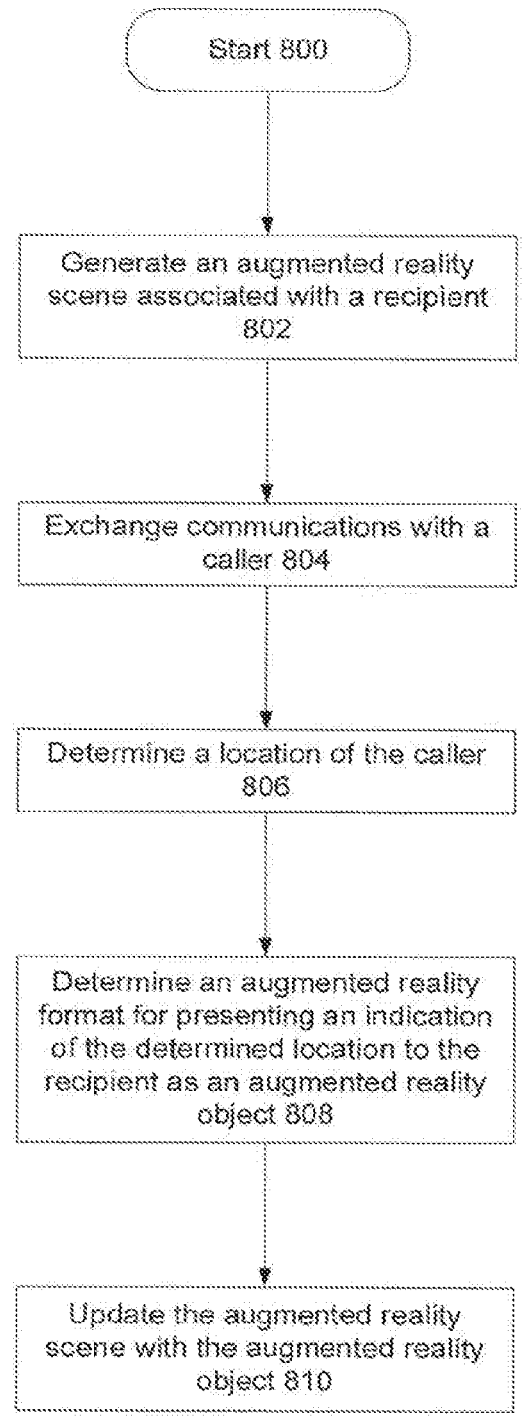
FIG. 8 depicts an example operational procedure for presenting a location indication of a digital communication in an augmented reality format.

FIG. 8 depicts an example operational procedure for presenting a location indication of a digital communication in an augmented reality format including operations 800, 802, 804, 806, 808, and 810. Operation 800 starts the operational procedure, where a digital communication, an augmented reality application, and a location-based service may be activated on a first computing device, such as any of the devices 210 of FIG. 2. The first computing device may be a receiving computing device associated with a recipient of a digital communication. Operation 800 may be followed by operation 802. Operation 802 (Generate an augmented reality scene associated with a recipient) illustrates generating an augmented reality scene based on at least a current geographic location of the first computing device. Operation 802 may be followed by operation 804. Operation 804 (Exchange communications with a caller) illustrates exchanging communications between the recipient and a caller. The caller may be associated with a second computing device, such as a calling computing device communicating digitally with the recipient. Operation 804 may be followed by operation 806. Operation 806 (Determine a location of the caller) illustrates determining a location of the caller. The location can be associated with a geographic location of the second computing device. The receiving computing device can determine the geographic location or a relative location using any of the location determination techniques described herein above. Operation 806 may be followed by operation 808. Operation 808 (Determine an augmented reality format for presenting an indication of the determined location to the recipient as an augmented reality object) illustrates determining a format for presenting a three dimensional indication of the geographic location as an augmented reality object within the augmented reality scene. The format can be derived from at least the geographic location, the digital communication, and presentation requirements. Additionally, the format can comprise a combination of visual, auditory, and haptic two and three dimensional presentations to perceptually indicate the geographic location. Further, the format may include additional information about objects, places, and persons within a certain range of the geographic location. Operation 808 may be followed by operation 810. Operation 810 (Update the augmented reality scene with the augmented reality object) illustrates updating the augmented reality scene with the augmented reality object perceptually indicating the geographic origin. The update may be based on the format derived under operation 808.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to indicate a geographic origin of a digital communication, the method comprising:
   retrieving an image of a scene based on a first geographic location of a first device;
   generating an augmented reality scene from the retrieved image;
   determining a second geographic location associated with the digital communication which is initiated from a second device towards the first device;
   displaying a first graphical object and a second graphical object in the augmented reality scene, wherein:
      the first graphical object includes a glyph, wherein the glyph includes an avatar of a user associated with the second device, the digital communication, and text that is descriptive of the second geographic location,
      the second graphical object includes text that specifies a direction and a distance from the first geographic location towards the second geographic location, and
      a length of the second graphical object is indicative of the distance from the first geographic location to the second geographic location; and updating a size of each of the first graphical object and the second graphical object in the augmented reality scene based on an update of a distance between the first device and the second device, wherein updating the size of the first graphical object includes increasing a size of the glyph in response to a decrease in the distance between the first device and the second device, and wherein updating the size of the second graphical object includes decreasing a size of the second graphical object in response to the decrease in the distance between the first device and the second device.

2. The method of claim 1, wherein retrieving the image of the scene comprises retrieving the image from data stored locally on the first device.

3. The method of claim 1, wherein retrieving the image of the scene comprises retrieving the image from another device or a server in communication with the first device.

4. The method of claim 1, wherein the first geographic location and the second geographic location are derived from one or more of: global positioning system (GPS) based information, cellular triangulation data, wireless access points interpolation data, and geographical tags.

5. The method of claim 1, wherein determining the second geographic location comprises determining a resolution level that is indicative of an accuracy range of the second geographic location, and wherein the resolution level is based on one or more of: a privacy level of sharing the second geographic location, and a preview presentation of the second geographic location.

6. The method of claim 1, further comprising:
animating the first graphical object until the digital communication is acknowledged by a user associated with the first device.

7. A method to indicate a geographic origin of a user that initiates a digital communication, the method comprising:
generating an augmented reality scene based on a first location of a recipient of the digital communication;
determining a second location of the user that initiates the digital communication, wherein determination of the second location is controlled by the user, and wherein the control comprises control of one or more of: a sharing degree, a resolution level, and a presentation preview;
determining a format for an object based on the first location and the second location, wherein the object includes a glyph, and wherein the glyph includes an avatar of the user, the digital communication, and text that is descriptive of the second location;
determining a format for another object, wherein the another object includes text that specifies a direction and a distance from the first location towards the second location, and wherein a length of the another object is indicative of the distance from the first location to the second location;
displaying the object and the another object in the augmented reality scene which is rendered on a device associated with the recipient of the digital communication;
increasing a size of the glyph, displayed in the augmented reality scene, in response to a decrease in a distance between the user and the recipient; and
decreasing a size of the another object, displayed in the augmented reality scene, in response to the decrease in the distance between the user and the recipient.

8. The method of claim 7, wherein determining the format for the object comprises determining a cross-modality presentation configured to provide a three-dimensional perception of the second location relative to the first location.

9. The method of claim 7, further comprising:
animating the first object until the digital communication is acknowledged by the recipient.

10. A system to indicate a geographic origin of a digital communication, the system comprising:
a processor; and
a memory communicatively coupled to the processor, wherein the memory is configured to store instructions that, in response to execution by the processor, cause the system to perform or control performance of operations that comprise:
retrieve an image of a scene based on a first geographic location of a first device;
generate an augmented reality scene from the retrieved image;
determine a second geographic location of a second device that initiated the digital communication towards the first device;
display a first graphical object and a second graphical object in the augmented reality scene rendered on the first device, wherein:
the first graphical object includes a glyph, wherein the glyph includes an avatar of a user associated with the second device, the digital communication, and text that is descriptive of the second geographic location,
a format of the first graphical object is indicative of whether the digital communication includes an email, a text message, a phone call, an instant message, or a social media message, and
the second graphical object includes information that is descriptive of a direction from the first geographic location towards the second geographic location;
update a size of each of the first graphical object and the second graphical object in the augmented reality scene based on an update of a distance between the first device and the second device,
wherein to update the size of each of the first graphical object and the second graphical object, the instructions, in response to execution by the processor, cause the system to perform or control performance of operations that comprise:
increase the size of the glyph in response to a decrease in the distance between the first device and the second device; and
decrease the size of the second graphical object in response to the decrease in the distance between the first device and the second device; and
animate the first graphical object until the digital communication is acknowledged by a user associated with the first device.

11. The system of claim 10, wherein to retrieve the image of the scene, the instructions, in response to execution by the processor, cause the system to perform or control performance of at least one operation that comprises:
retrieve the image of the scene from data stored locally on the first device.

12. The system of claim 10, wherein to retrieve the image of the scene, the instructions, in response to execution by the processor, cause the system to perform or control performance of at least one operation that comprises:
retrieve the image of the scene from another device or a server in communication with the first device.

13. The system of claim 10, wherein the first geographic location and the second geographic location are derived from one or more of: global positioning system (GPS) based information, cellular triangulation data, wireless access points interpolation data, and geographical tags.

14. The system of claim 10, wherein determination of the second geographic location comprises determination of a resolution level, and wherein the resolution level is controlled at the second device based on one or more of: a privacy level of sharing the second geographic location, and a preview presentation of the second geographic location.

15. The system of claim 10, wherein the second graphical object includes text that specifies the direction and the distance from the first geographic location towards the second geographic location, and wherein a length of the second graphical object is indicative of the distance from the first geographic location to the second geographic location.

16. A non-transitory computer readable medium having stored thereon computer readable instructions that, in response to execution by a processor, cause a first device to perform or control performance of operations to indicate a geographic origin of a digital communication, wherein the operations comprise:
 retrieve an image of a scene based on a first geographic location of the first device;
 generate an augmented reality scene from the retrieved image;
 determine a second geographic location associated with the digital communication which is initiated from a second device towards the first device;
 display a first graphical object and a second graphical object in the augmented reality scene, wherein:
  the first graphical object includes a glyph, wherein the glyph includes an avatar of a user associated with the second device, the digital communication, and text that is descriptive of the second geographic location,
  the second graphical object includes text that specifies a direction and a distance from the first geographic location towards the second geographic location, and
  a length of the second graphical object is indicative of the distance from the first geographic location to the second geographic location; and
 update a size of each of the first graphical object and the second graphical object in the augmented reality scene based on an update of a distance between the first device and the second device, wherein the updated size of the first graphical object includes an increased size of the glyph, in response to a decreased distance between the first device and the second device, and wherein the updated size of the second graphical object includes a decreased size of the second graphical object, in response to the decreased distance between the first device and the second device.

17. The non-transitory computer-readable medium of claim 16, wherein to retrieve the image of the scene, the instructions, in response to execution by the processor, cause the first device to perform or control performance of at least one operation that comprises:
 retrieve the image of the scene from data stored locally on the first device.

18. The non-transitory computer-readable medium of claim 16, wherein to retrieve the image of the scene, the instructions, in response to execution by the processor, cause the first device to perform or control performance of at least one operation that comprises:
 retrieve the image of the scene from another device or a server in communication with the first device.

19. The non-transitory computer-readable medium of claim 16, wherein to determine the second geographic location, the instructions, in response to execution by the processor, cause the first device to perform or control performance of at least one operation that comprises:
 determine a resolution level, and wherein the resolution level is controlled at the second device based on one or more of: a privacy level of sharing the second geographic location, and a preview presentation of the second geographic location.

20. The non-transitory computer-readable medium of claim 16, wherein the first geographic location and the second geographic location are derived from one or more of: global positioning system (GPS) based information, cellular triangulation data, wireless access points interpolation data, and geographical tags.

21. The non-transitory computer readable medium of claim 16, wherein the operations further comprise:
 animate the first graphical object until the digital communication is acknowledged by a user associated with the first device.

* * * * *